(12) United States Patent
Hodges et al.

(10) Patent No.: US 11,899,151 B2
(45) Date of Patent: Feb. 13, 2024

(54) SURVEYING TECHNIQUES USING MULTIPLE DIFFERENT TYPES OF SOURCES

(71) Applicant: PGS Geophysical AS, Oslo (NO)

(72) Inventors: Edwin Hodges, Woking (DE); Manuel Beitz, Oslo (NO)

(73) Assignee: PGS Geophysical AS, Oslo (NO)

( * ) Notice: Subject to any disclaimer, the term of this patent is extended or adjusted under 35 U.S.C. 154(b) by 1173 days.

(21) Appl. No.: 16/213,214

(22) Filed: Dec. 7, 2018

(65) Prior Publication Data
US 2019/0187314 A1     Jun. 20, 2019

Related U.S. Application Data

(60) Provisional application No. 62/767,379, filed on Nov. 14, 2018, provisional application No. 62/599,984, filed on Dec. 18, 2017.

(51) Int. Cl.
*G01V 1/38* (2006.01)

(52) U.S. Cl.
CPC ...... *G01V 1/3808* (2013.01); *G01V 2210/121* (2013.01); *G01V 2210/127* (2013.01);
(Continued)

(58) Field of Classification Search
CPC .......... G01V 2210/127; G01V 1/3808; G01V 2210/121; G01V 2210/1212; G01V 2210/1214; G01V 2210/61; G01V 2210/612; G01V 3/12; G01V 1/303; G01V 1/308
(Continued)

(56) References Cited

U.S. PATENT DOCUMENTS 7,218,572 B2   5/2007   Parkes
7,257,049 B1   8/2007   Laws et al.
(Continued)

FOREIGN PATENT DOCUMENTS

BR   102014005542 A2 *   4/2015   ............... G01V 1/38
WO   2015104638   7/2015

OTHER PUBLICATIONS

International Search Report in application No. PCT/EP2018/085693 dated Jun. 6, 2019, 17 pages.

*Primary Examiner* — Jeffrey P Aiello

(57) ABSTRACT

Techniques are disclosed relating to acquisition and imaging for marine surveys. In some embodiments, a transition survey that uses both one or more sources of a first type (e.g., impulsive sources) and one or more sources of a second type (e.g., vibratory sources) may facilitate calibration of prior surveys that use the first type of sources with subsequent surveys that use the second type of source. In some embodiments, the different types of sources may be operated simultaneously at approximately the same location. In some embodiments, signals generated by the sources are separated, e.g., using deconvolution. The signals may then be compared to generate difference information, which in turn may be used to adjust sensor measurements from a previous or subsequent survey. In various embodiments, the disclosed techniques may improve accuracy in images of geological formations and may facilitate transitions to new types of seismic sources while maintaining continuity in 4D surveys.

48 Claims, 10 Drawing Sheets

(52) U.S. Cl.
    CPC ............... *G01V 2210/1212* (2013.01); *G01V 2210/1214* (2013.01); *G01V 2210/61* (2013.01); *G01V 2210/612* (2013.01)

(58) Field of Classification Search
    USPC ................... 73/64.48; 166/250.01; 324/323; 382/109; 702/2, 5, 10–11, 14, 16, 18
    See application file for complete search history.

(56) References Cited

U.S. PATENT DOCUMENTS

| | | | |
|---|---|---|---|
| 9,127,543 B2* | 9/2015 | Beasley | G01V 1/003 |
| 10,101,480 B2 | 10/2018 | Lunde | |
| 11,169,292 B2* | 11/2021 | Cotton | G01V 1/36 |
| 2006/0250891 A1* | 11/2006 | Krohn | G01V 1/37 |
| | | | 367/38 |
| 2011/0292763 A1* | 12/2011 | Coates | G01V 1/18 |
| | | | 367/25 |
| 2012/0033525 A1 | 2/2012 | Abma et al. | |
| 2014/0269180 A1* | 9/2014 | Tenghamn | G01V 11/00 |
| | | | 73/382 G |
| 2015/0234072 A1 | 8/2015 | McConnell et al. | |
| 2016/0109598 A1* | 4/2016 | Lunde | G01V 1/366 |
| | | | 367/21 |
| 2016/0187513 A1* | 6/2016 | Poole | G01V 1/362 |
| | | | 702/16 |
| 2016/0327672 A1* | 11/2016 | Lacombe | G01V 1/366 |
| 2017/0256080 A1* | 9/2017 | Gu | E21B 7/00 |
| 2020/0191985 A1* | 6/2020 | Kristiansen | G01V 1/303 |

\* cited by examiner

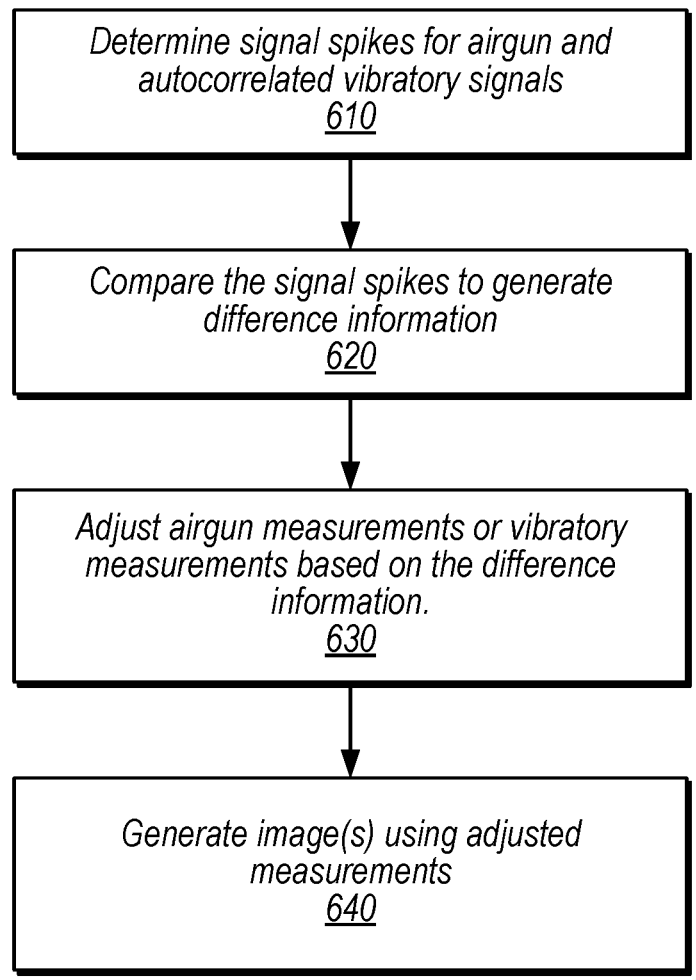
Fig. 6A
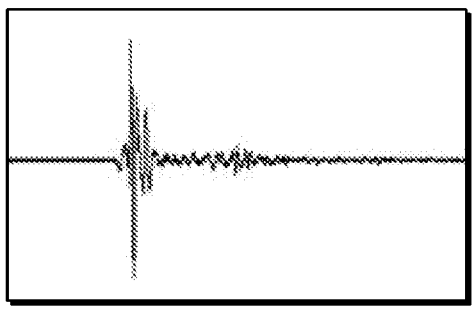
Example airgun impulse
650
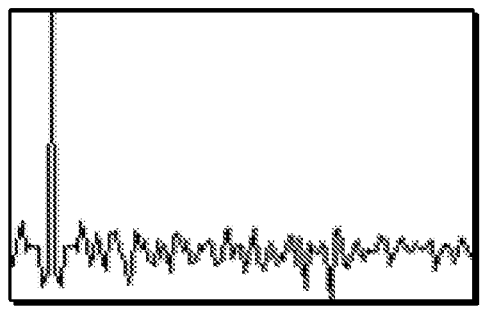
Example autocorrelation of a gold code
660
Fig. 6B Access seismic data recorded using a plurality of seismic sensors during a transition survey, wherein the seismic data was recorded based on signals reflected from one or more geological structures in response to generating seismic signals using a first type of seismic source while also generating seismic signals using a second, different type of seismic source
910

Adjust, based on the accessed seismic data, sensor signals from at least one of a prior seismic survey with the first type of seismic source or a subsequent seismic survey with the second type of seismic source, wherein the adjustment calibrates one of the prior and the subsequent surveys with the other
920

Fig. 9

SURVEYING TECHNIQUES USING MULTIPLE DIFFERENT TYPES OF SOURCES

CROSS-REFERENCE TO RELATED APPLICATIONS

This application claims priority to U.S. Provisional Patent Application Nos. 62/599,984, filed on Dec. 18, 2017 and 62/767,379, filed on Nov. 14, 2018, each of which is hereby incorporated entirely as if fully set forth herein.

BACKGROUND

Geophysical surveys are often used for oil and gas exploration in geophysical formations, which may be located below marine environments. Various types of signal sources and geophysical sensors may be used in different types of geophysical surveys. Seismic geophysical surveys, for example, are based on the use of seismic waves. Electromagnetic geophysical surveys, as another example, are based on the use of electromagnetic waves. In some surveys, a survey vessel may tow one or more sources (e.g., air guns, marine vibrators, electromagnetic sources, etc.) and one or more streamers along which a number of sensors (e.g., hydrophones and/or geophones and/or electromagnetic sensors) are located.

During the course of a geophysical survey, the various sensors collect data indicative of geological structures, which may be analyzed to determine the possible locations of hydrocarbon deposits. In 4D surveying techniques, surveys may be performed at a given location at different times, e.g., to determine changes to hydrocarbon deposits. Many seismic surveys have been performed using impulsive sources (e.g., airguns). Recently, other types of seismic sources have been proposed and implemented, such as vibratory sources, for example.

BRIEF DESCRIPTION OF THE DRAWINGS

FIGS. 6A and 6B are diagrams illustrating exemplary calibration of survey passes using a comparison of an autocorrelation peak with an airgun impulse, according to some embodiments.

FIG. 9 is a flow diagram illustrating an exemplary method for adjusting sensor measurements based on a transitional seismic survey, according to some embodiments.

DETAILED DESCRIPTION

Figure 1:
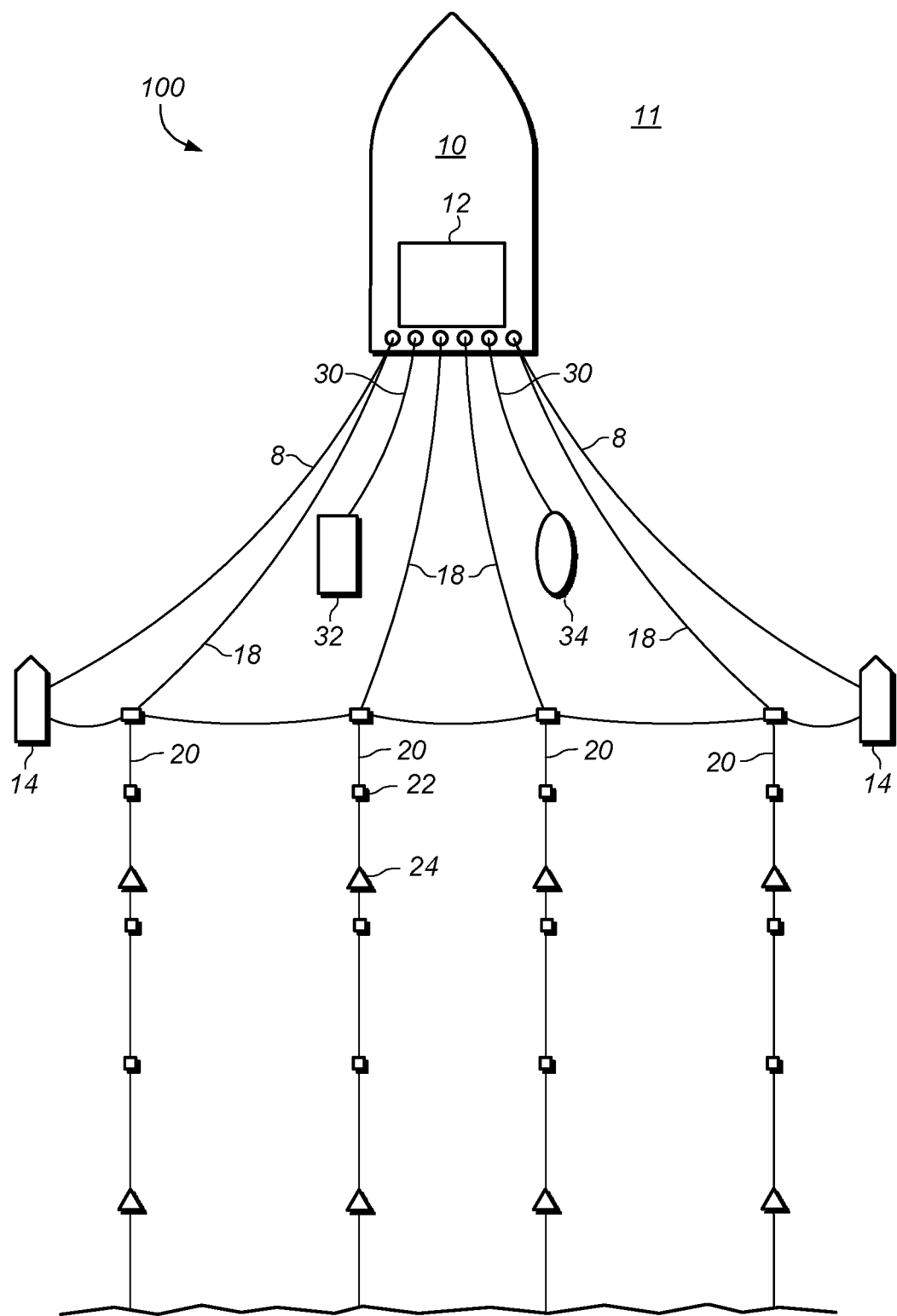
FIG. 1 shows an exemplary marine geophysical survey system, according to some embodiments.
Figure 2:
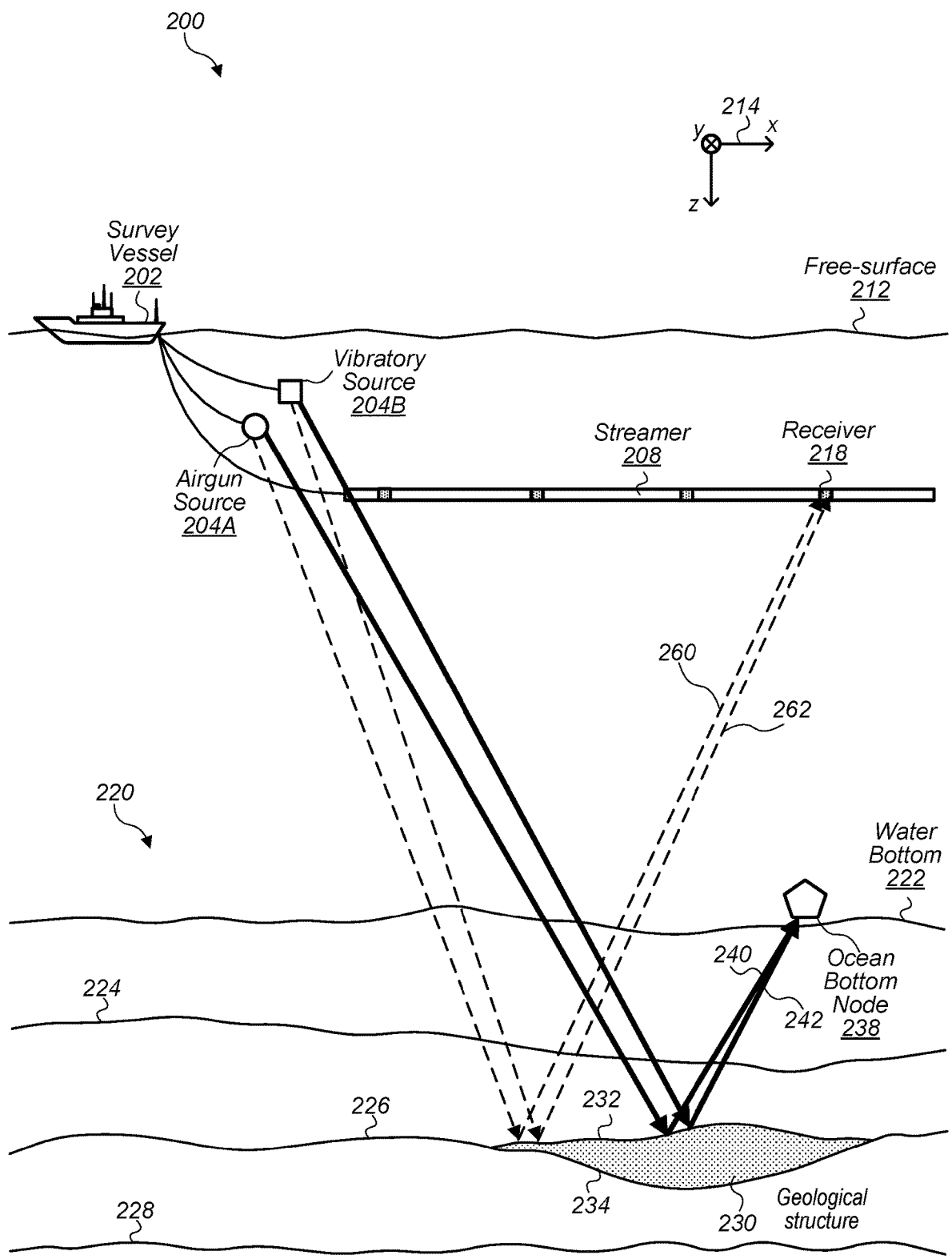
FIG. 2 illustrates a marine geophysical survey using both airgun and vibratory sources, according to some embodiments.

This disclosure initially describes, with reference to FIG. 1, an overview of a geophysical survey system. FIG. 2 shows an example of a transition geophysical survey using two example types of seismic sources. Techniques for calibrating survey measurements acquired using different types of seismic sources are discussed with respect to FIGS. 3-7. Exemplary methods and an example computing system are described with reference to FIGS. 8-10.

In some embodiments, two types of sources operate simultaneously during a transition survey (e.g., by firing an airgun while a vibratory source is activated). As used herein, the term "transition survey" refers to a survey that facilitates a change from using one type of survey source to another, e.g., a change from airgun sources to vibratory sources in a 4D survey. In some embodiments, this survey technique may facilitate processing to calibrate seismic surveys performed using different types of sources. The calibration may compensate for differences between types of sources, e.g., by normalizing sensor measurements among the types of sources. This calibration may advantageously improve accuracy of images of geophysical formations based on geophysical surveys and may avoid discontinuity in 4D surveys due to a transition between types of sources, for example.

Overview of a Seismic Survey

Referring to FIG. 1, an illustration of a marine geophysical survey system 100 is shown (not necessarily to scale), according to some embodiments. In the illustrated embodiment, system 100 includes survey vessel 10, airgun source 32 (represented using a rectangular shape), vibratory source 34 (represented using an oval shape), source cables 30, paravanes 14, and streamers 20 (streamers 20 are shown truncated at the bottom of FIG. 1.). In some embodiments, survey vessel 10 may be configured to move along a surface of a body of water 11 such as a lake or ocean. In the illustrated embodiment, survey vessel 10 tows streamers 20, airgun source 32, vibratory source 34, and paravanes 14, which may be used to provide a desired amount of spread among streamers 20. In other embodiments, streamers 20 may be towed by a separate vessel (not shown), rather than survey vessel 10 that tows airgun source 32 and vibratory source 34. In some embodiments, airgun source 32 and/or vibratory source 34 may be steered, using any of a variety of known devices, to maintain a determined distance between these elements during a survey. In some embodiments, survey vessel 10 may tow only vibratory sources 34 while a separate vessel simultaneously tows only airgun sources 32. In some embodiments, streamers 20 may include sensors 22 (e.g., hydrophones, geophones, electromagnetic sensors, etc.). In other embodiments, streamers 20 may further include streamer steering devices 24 (also referred to as "birds") which may provide selected lateral and/or vertical forces to streamers 20 as they are towed through the water, typically based on wings or hydrofoils that provide hydrodynamic lift. In some embodiments, streamers 20 may further include tail buoys (not shown) at their respective back ends.

In some embodiments, survey vessel 10 may include equipment, shown generally at 12 and for convenience collectively referred to as a "recording system." In some embodiments, recording system 12 may include devices such as a data recording unit (not shown separately) for making a record of signals generated by various geophysical sensors. Recording system 12 may also include navigation equipment (not shown separately), which may be configured to control, determine, and record the geodetic positions of: survey vessel 10, airgun source 32, vibratory source 34, streamers 20, sensors 22, etc. In the illustrated embodiment, streamers 20 are coupled to survey vessel 10 via cables 18.

In some embodiments, each of airgun source 32 and vibratory source 34 may include sub-arrays of multiple individual signal sources. For example, in some embodiments, an airgun source 32 may include a plurality of airguns and a vibratory source 34 may include a plurality of marine vibrators. In various embodiments, a geophysical survey system may include any appropriate number of towed airgun sources 32, vibratory sources 34, and streamers 20.

Collectively, the survey data that is recorded by recording system 12 may be referred to as "marine survey input data", according to some embodiments. In embodiments where the survey being performed is a seismic survey, the recorded data may be more specifically referred to as "marine survey seismic data," although the marine survey input data may encompass survey data generated by other techniques. In various embodiments, the marine survey input data may not necessarily include every observation captured by sensors 22 (e.g., the raw sensor data may be filtered before it is recorded). Also, in some embodiments, the marine survey input data may include data that is not necessarily indicative of subsurface geology but may, nevertheless, be relevant to the circumstances in which the survey was conducted (e.g., environmental data such as water temperature, water current direction and/or speed, salinity, etc.). In some embodiments, the geodetic position (or "position") of the various elements of system 100 may be determined using various devices, including navigation equipment such as relative acoustic ranging units and/or global navigation satellite systems (e.g., a global positioning system (GPS)).

Various items of information relating to geophysical surveying (e.g., raw data collected by sensors and/or marine survey input data generally, or products derived therefrom by the use of post-collection processing), may be recorded in a tangible computer-readable medium in the course of manufacturing a geophysical data product according to methods described herein. Some non-limiting examples of computer-readable media may include tape reels, hard drives, CDs, DVDs, flash memory, print-outs, etc., although any tangible computer-readable medium may be employed to create the geophysical data product. In some embodiments, raw analog data from streamers may be stored in the computer readable medium. In other instances, as noted above, the data may first be digitized and/or conditioned prior to being stored in the computer readable medium. In yet other instances, the data may be fully processed into a two- or three-dimensional map of the various geophysical structures, or another suitable representation, before being stored in the computer readable medium. The geophysical data product may be manufactured during the course of a survey (e.g., by equipment on a vessel) and then, in some instances, transferred to another location for geophysical analysis, although analysis of the geophysical data product may occur contemporaneously with survey data collection. In other instances, the geophysical data product may be manufactured subsequent to survey completion, e.g., during the course of analysis of the survey.

Example Seismic Data Acquisition System

FIG. 2 shows a side-elevation view of an example seismic data acquisition system 200 comprising a survey vessel 202 towing sources 204A-204B and one streamer 208 beneath a free surface 212 of a body of water, according to some embodiments. The body of water may be, for example, an ocean, a sea, a lake, or a river, or any portion thereof. In this example, the streamer 208 is attached at one end to the survey vessel 202 via a streamer-data-transmission cable. In the illustrated embodiment, streamer 208 forms a planar horizontal data acquisition surface with respect to the free surface 212. In practice, however, the data acquisition surface may be smoothly varying due to active sea currents and weather conditions. In other words, in some embodiments, although the streamer 208 is illustrated in FIG. 2 as straight and substantially parallel to the free surface 212, in practice, the towed streamer 208 may undulate as a result of dynamic conditions of the body of water in which the streamer 208 is submerged. A data acquisition surface is not limited to having a planar horizontal orientation with respect to the free surface 212. The streamer 208 may also be towed at depths such that the data acquisition surface is intentionally angled or curved with respect to the free surface 212. A data acquisition surface is not limited to one streamer as shown in the illustrated embodiment. In practice, the number of streamers used to form a data acquisition surface can range from as few as one streamer to as many as 20 or more streamers, according to some embodiments.

In the illustrated plot, an xz-plane 214 of the Cartesian coordinate system is shown having three orthogonal, spatial coordinate axes labeled x, y and z. The coordinate system is used to specify orientations and coordinate locations within the body of water. The x-direction is parallel to the length of the streamer (or a specified portion thereof when the length of the streamer is curved) and is referred to as the "in-line" direction. The y-direction is perpendicular to the x-axis and substantially parallel to the free surface 212 and is referred to as the "cross-line" direction. The z-direction is perpendicular to the xy-plane (i.e., perpendicular to the free surface 212) with the positive z-direction pointing downward away from the free surface 212. The streamer 208 is a long cable containing power and data-transmission lines that connect receivers or sensors represented by shaded rectangles 218 spaced-apart along the length of each streamer to seismic data acquisition equipment and data-storage devices located on board the survey vessel 202. The ocean bottom node 238 is a receiver or sensor represented by a pentagon at the water bottom 222. In some embodiments, the ocean bottom node 238 is fixed to the sea floor.

In the illustrated embodiment, a cross-sectional view of the survey vessel 202 towing the sources 204 above a subterranean formation 220 is shown. Curve 222, in the illustrated embodiment, represents a top surface of the subterranean formation 220 located at the bottom of the body of water. The subterranean formation 220 is composed of a number of subterranean layers of sediment and rock in the illustrated embodiment. Curves 224, 226, and 228 represent interfaces between subterranean layers of different compositions. A shaded region 230, bounded at the top by a curve 232 and at the bottom by a curve 234, represents a subterranean geological structure, the depth and positional coordinates of which may be determined, at least in part, by analysis of seismic data collected during a marine seismic survey.

Example Survey Operations Using Multiple Types of Sources Simultaneously

In some embodiments, as the survey vessel 202 travels over the subterranean formation 220, the sources 204A and 204B are respectively fired and activated to produce an acoustic signal at spatial and/or temporal intervals, according to some embodiments. In the illustrated embodiment, sources 204 are operated simultaneously or near-simultaneously such that wavefronts from both sources propagate through the body of water at the same time. For example, airgun source 204A may be fired while vibratory source 204B is activated.

The illustrated example shows example rays that represent paths of acoustic wavefronts that travel from sources 204 into the subterranean formation 220. In the illustrated embodiment, the ocean bottom node 238 and the receivers 218 are sensors that receive signals initiated from signal sources 204 and reflected from subsea formations. In the illustrated example, signals received by receiver 218 are shown using dashed lines and signals received by node 238 are shown using solid lines.

In the illustrated embodiment, rays 260 and 262 are respectively emitted from airgun source 204A and vibratory source 204B at approximately the same location. Therefore, in the illustrated embodiment, rays 260 and 262 are reflected from the same portion of geological structure 230 of subterranean formation 220 and recorded at a receiver 218 (e.g., among other receivers that may also receive reflected signals). In some embodiments, these measurements may allow for efficient and accurate calibration based on the recorded signals, because the signals from the two types of sources should have a known relationship, absent a need for calibration. Similarly, in the illustrated embodiment, rays 240 and 242 emitted at approximately the same location from airgun source 204A and vibratory source 204B, respectively, are reflected from the same location of surface 232 and recorded by node 238. Note that for simplicity of illustration only a handful of ray paths are represented, and ray paths that extend to other subsea interfaces are not shown.

As used herein, "activation" of a vibratory source is intended to be construed according to its well understood meaning, which includes causing at least a portion of the source to have vibratory movement in a body of water. Typically, vibratory sources are driven using codes or functions, such as linear sweeps, random sweeps, gold codes, M-codes, other modulation sequences, etc. Note that incidental movement of a vibratory source due to environmental conditions such as ocean currents is not considered activation of the source. Further, even while activated, a vibratory source may happen to be still momentarily, e.g., at a peak or valley of a wave-style modulation when changing directions, but is still considered activated during that moment.

In some embodiments, an airgun is fired during the activation of a vibratory source such that both sources emit signals simultaneously. In some embodiments, as used herein, "near-simultaneous" operations/firings include those without meaningful differences in actuation time between them. As would be understood by one of ordinary skill in the art with the benefit of this disclosure, operational circumstances can cause intermittent gaps in actuations (due to equipment failure, etc.), and "near-simultaneously" should be read to include actuations with intermittent or periodic gaps, whether planned or unplanned as well as actuations without intermittent or periodic gaps, thus including "simultaneously."

In other implementations, the one or more of sources 204A, 204B, and streamer 208 may be towed by different survey vessels. In other implementations, the sources 204A and 204B may be a combination of several air guns and several marine vibrators (or various combinations of two or more different types of sources). It should be noted that the number of sources 204 is not limited to a single source of each type (airgun source 204A and vibratory source 204B). In practice, the number of sources selected to generate acoustic energy may range from as few as one source to three or more sources and the sources may be towed in groups or arrays by one or more vessels.

Overview of 4D Survey Techniques

Figure 3:
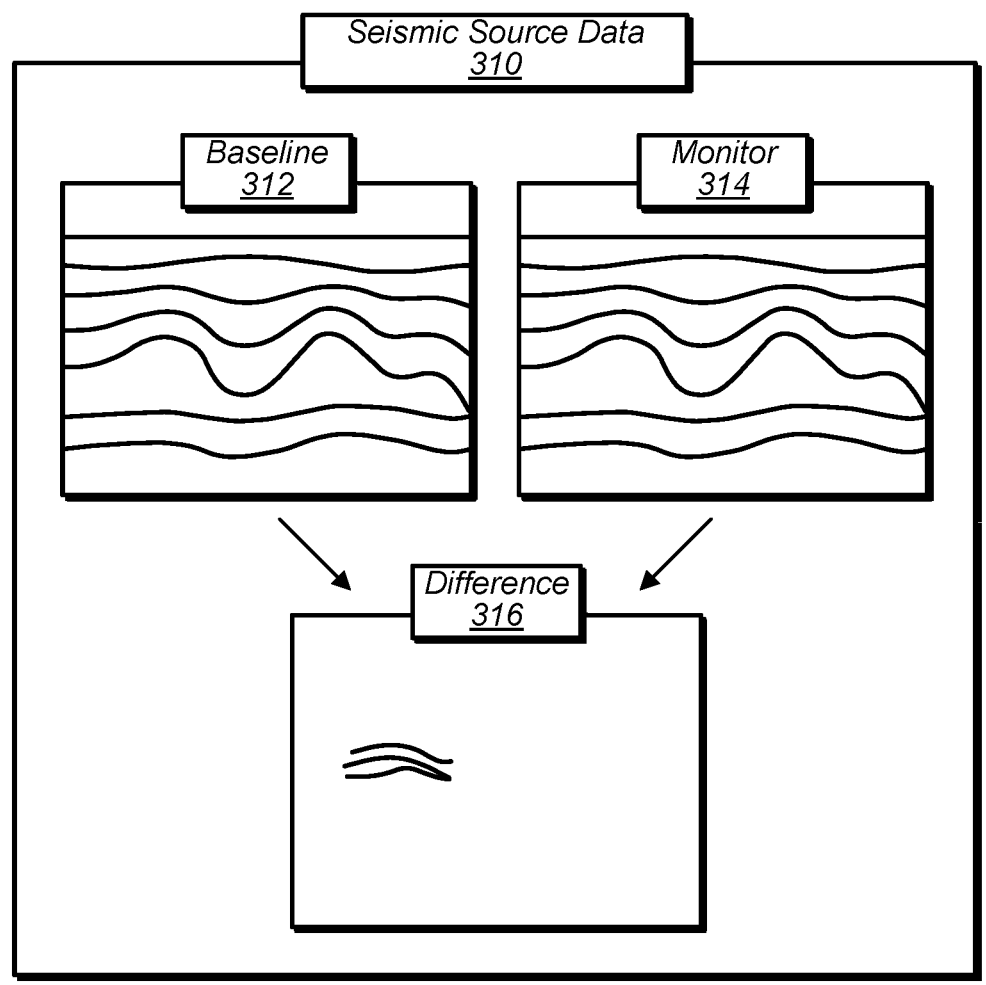
FIG. 3 illustrates an exemplary comparison of baseline and monitor surveys for a 4D survey, according to some embodiments.

FIG. 3 illustrates an exemplary comparison of baseline and monitoring surveys, according to some embodiments. In the context of 4D surveying, the phrase "monitor survey" refers to a subsequent survey over at least a portion of the same area covered by a previous ("baseline") survey to detect changes in the subsurface relative to the time of the baseline survey. In the illustrated embodiment, seismic source data 310 includes baseline image 312 and monitor image 314 that are processed to produce a difference image 316 that shows differences between the baseline and monitor images.

In some embodiments, the seismic source data is obtained from an airgun. In some embodiments, the seismic source data is obtained from a marine vibrator. In some embodiments, the seismic source data is obtained from other types of marine signal sources (e.g. electromagnetic sources, etc.).

In the illustrated embodiment, baseline 312 is generated from a first survey. In the illustrated embodiment, monitor 314 is generated from a second survey obtained with the same type of signal source (e.g., in some examples the same exact source) and at the same location as baseline 312. The second survey may be performed at a later point in time (e.g., days, months, years, etc.) than the first survey. In the illustrated embodiment, the image 316 is generated by comparing the monitor survey 314 with the baseline survey 312. In the illustrated embodiment, image 316 may show changes in the geological structure at a particular location based on the recorded seismic source data 310. In some embodiments, monitor survey 314 may become a baseline survey for one or more future monitor surveys.

In some embodiments, various preprocessing may be performed on the survey data before the baseline and monitor images are created. In some embodiments, a 4D survey performed using seismic sources over periods of time may provide information concerning changes in the geological structure of the earth e.g., the depletion over time of a natural resource such as a hydrocarbon deposit.

4D Survey Techniques with a Transition Survey

Figure 4:
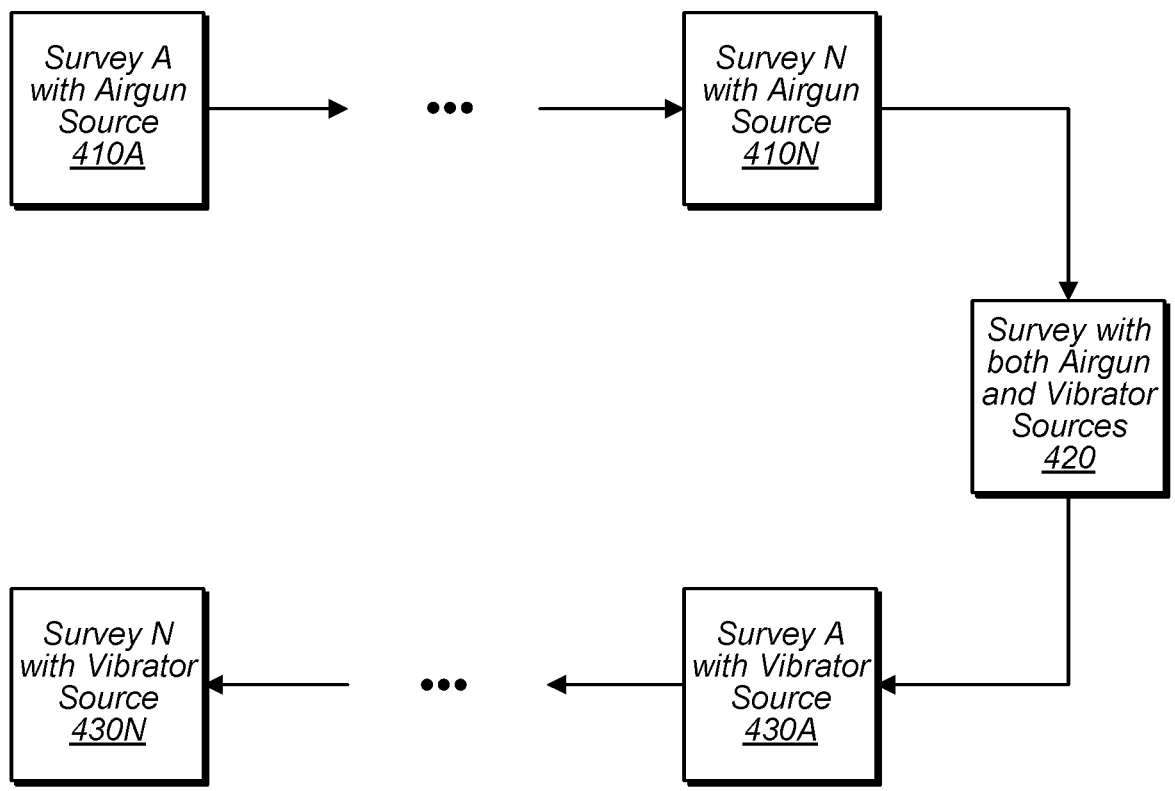
FIG. 4 is a block diagram illustrating an exemplary transition in data acquisition for a 4D survey from a first type of source to a second type of source, including a transition survey that includes both types of sources, according to some embodiments.

FIG. 4 is a diagram illustrating an exemplary sequence of surveys, including a transition survey for calibrating a transition from a first type of source to a second type of source, according to some embodiments. In the illustrated embodiment, the sequence includes surveys 410A-410N with an airgun source, a survey 420 with both airgun and vibrator sources, and surveys 430A-430N with a vibrator source. In some embodiments, surveys 410 use only airgun sources and surveys 430 use only vibratory sources. In some embodiments, the transition survey 420 may enable both backward and forward compatibility of survey measurements from different types of sources.

In the illustrated embodiment, survey 410A is a baseline airgun survey with monitor surveys 410B-410N also acquired with an airgun source. In the illustrated embodiment, a new transition monitor survey 420 with both airgun and vibrator sources is acquired. In some embodiments, transition survey 420 generates measurements from signals generated simultaneously or near-simultaneously by both an airgun and vibrator. In some embodiments, transition survey 420 may use several airgun sources and/or several vibrator sources. In some embodiments, transition survey 420 may use only one airgun source and several vibrator sources, or vice versa. In some embodiments, the airgun and vibrator signals of transition survey 420 are separated (e.g., by deconvolution, image comparison etc.) and used to determine calibration information. In the illustrated embodiment vibrator survey 430A is a baseline survey for future monitor surveys (vibrator surveys 430B-430N) acquired with a vibrator source only.

Calibration data may be used to modify various data sets to improve compatibility. For example, data from one or more surveys 410A-410N (e.g., airgun only surveys) may be adjusted (e.g., using transition survey 420) to be compatible with data from surveys 430A-430N (e.g., vibrator only surveys). In some embodiments, signals from one or both sources in the transition survey may be calibrated to be compatible with surveys 410 and/or 430. Similarly, data from one or more surveys 430A-430N may be calibrated (e.g., using transition survey 420) to be compatible with data from surveys 410A-410N. In various embodiments, data and/or images from calibrated surveys may be compared, e.g., to determine changes in geological formations over time.

Overview of Use of Calibration Data

Figure 5:
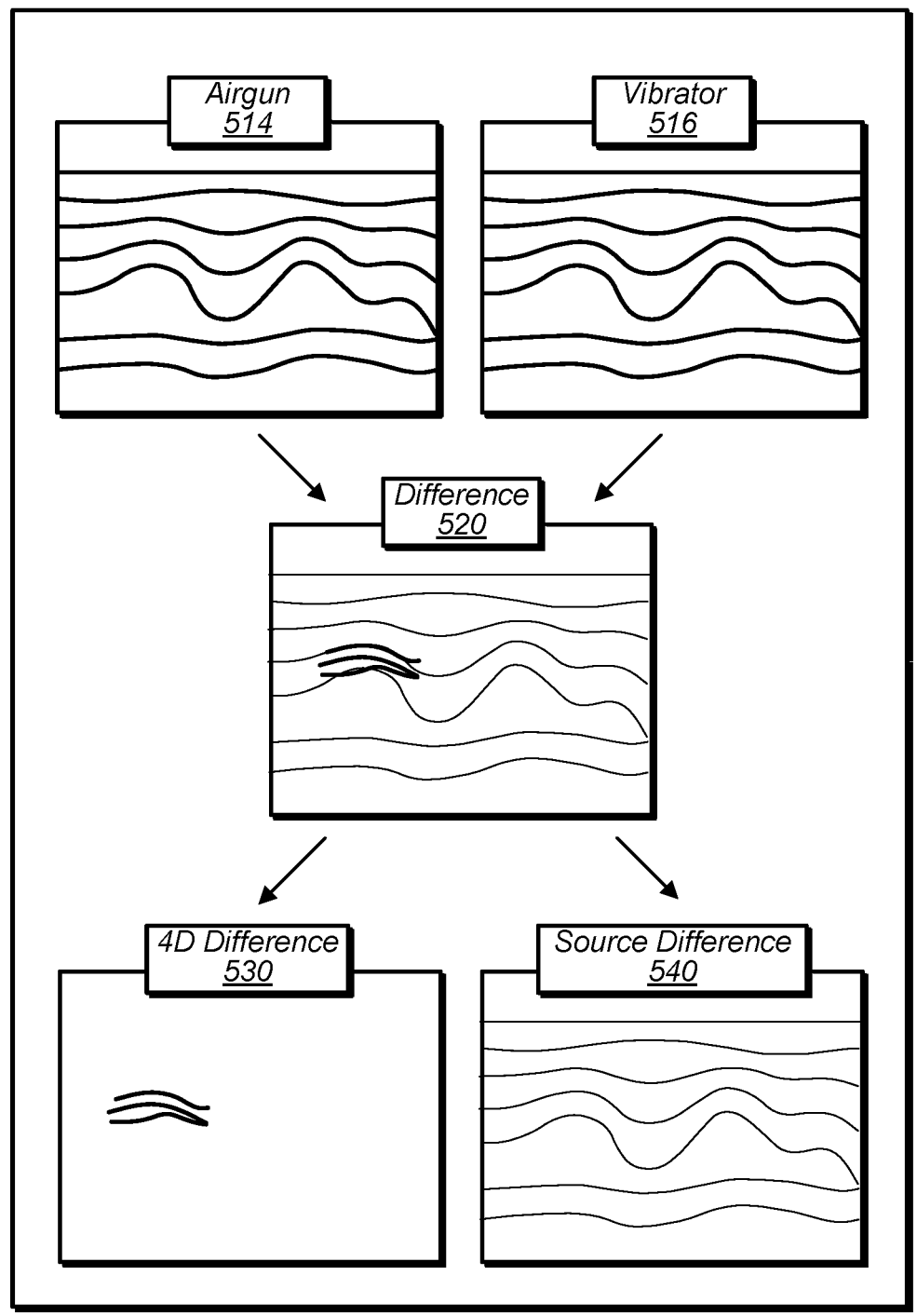
FIG. 5 is a block diagram illustrating an overview of data associated with different types of sources, according to some embodiments.

FIG. 5 is a diagram illustrating an overview of data associated with different types of sources, according to some embodiments. In the illustrated embodiment, an airgun image 514 and a vibrator image 516 are generated based on survey data of a given formation using the respective types of sources. As shown, a comparison of these images may correspond to difference image 520. In the illustrated example, this difference image 520 includes both differences due to changes in the geological formation over time (represented in image form as 4D difference 530) and differences due to the different sources (represented in image form as source difference 540). Note that images of FIG. 5 are shown for purposes of illustration and are not intended to limit the scope of calibration processing.

The example shown in FIG. 5 may occur, for example, when using data from prior airgun surveys with data from subsequent vibrator surveys. If knowledge of the 4D difference is desired, the source difference 540 may contaminate this data. Note that, in ideal situations, there may not be a source difference. In real-world applications, however, this phenomenon is typically encountered when using different types of sources.

Therefore, in some embodiments, the transition survey operates an impulsive source and vibratory source simultaneously at approximately the same location, which allows a comparison of sensor measurements from the two sources to determine source difference data (without any 4D difference, because the formation has not changed). Knowledge of the source difference data may then allow calibration of other surveys, e.g., to generate accurate 4D difference information.

In some embodiments, calibration data may be generated prior to generating any images for a survey, while in other embodiments calibration data may be generated at least partially post-imaging.

Exemplary Techniques for Generating Calibration Data

In some embodiments, signals from different types of sources in a given transition survey pass may be separated as a first step in generating calibration data. In some embodiments, deconvolving the signals recorded in transition survey 420 separates the signals from the airgun source and the vibratory source based on the known modulation of the vibratory source used in survey 420. In other embodiments, the signals from different sources may be separated based on a known signature of the airgun, by suppressing vibratory signals during an interval corresponding to the airgun impulse, etc. After separating the signals, one or more of various techniques may be used to generate calibration data. FIGS. 6 and 7, discussed in detail below, show two examples of such techniques.

In some embodiments, the signals from different types of sources are expected to have some known relationship, absent a need for calibration. Therefore, in some embodiments, generating calibration data is based on differences from the expected relationship exhibited in the data from the transition survey.

FIGS. 6A and 6B illustrate one example of using an expected relationship when comparing signals measured using a vibratory source and signals measured using an impulsive source to obtain calibration data. In the illustrated embodiment, element 650 of FIG. 6B shows an example airgun impulse signal generated by firing an airgun. In addition, in the illustrated embodiment, element 660 of FIG. 6B shows an exemplary autocorrelation of a gold code that may be used to drive a vibratory source. Although gold codes are used for purposes of illustration, autocorrelation results may be generated for various types of modulation (e.g., linear sweeps, random sweeps, etc.). Comparing spikes shown in elements 650 and 660 may produce an actual relationship that is different from the expected relationship, therefore providing difference information that may be used to determine calibration information.

In other embodiments, signals at various levels of processing may be compared to determine a difference from an expected relationship. For example, a measured signal based on a vibratory source may be compared with airgun data without autocorrelation. Note that the expected relationship used in this example is different than the expected relationship used in other examples (e.g., different for measured signals vs. autocorrelated measured signals).

FIG. 6A is a flow diagram illustrating an example method for pre-imaging calibration, according to some embodiments. The method shown in FIG. 6A may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 610, in the illustrated embodiment, a computing system determines a signal spike in sensor measurements from an airgun source and a spike in autocorrelation results for sensor measurements from a vibratory source.

At 620, in the illustrated embodiment, the signal spikes are compared to generate difference information. In some embodiments, one or both of the spikes may be scaled or processed before comparison, such that the scaled spikes are expected to be the same, in the absence of a need for calibration.

At 630, in the illustrated embodiment, airgun measurements or vibratory measurements are adjusted based on the difference information. In various embodiments, this may calibrate the adjusted measurements with other data sets from another type of source. Examples of adjustments may include scaling one or both of the spikes based on the comparison of 620 such that the results have similar amplitudes (which may be in addition to any scaling performed prior to the comparison) or shifting one or both of the spikes based on the comparison of 620 such that they occur at the same time. In other embodiments, any of various appropriate adjustments may be performed at various different stages of calibration, such as adjusting raw data, adjusting information indicating time intervals between emission of signals at a source and reception of the signals at a sensor, adjusting one or more filters, etc.

Note that the adjusting of element 630 may be performed on data from a transition survey or data from another survey (e.g., that uses only one type of source). In some embodiments, a system performing the adjustment may be different than a system performing the comparison.

At 640, in the illustrated embodiment, the system generates one or more images using the adjusted measurements. In various embodiments, the disclosed techniques may improve imaging accuracy for 4D surveys that use different types of sources for different surveys.

In some embodiments, a seismic signal dataset may be processed using designature techniques before calibration. For example, measured signals may be processed to remove noise by performing a designature technique. In some embodiments, performing a designature technique on a dataset involves two components, zero phasing and de-bubbling, to prepare the data for further processing. Zero phasing and de-bubbling involve calibrating and combining two near field source datasets (e.g., signals recorded close to the signal source) for a source. In some embodiments, applying a zero-phase filter on a source signal involves applying the filter in both forward and reverse time directions. De-bubbling involves removing the signal "bubble" or "noise" that occurs when a seismic source is fired as seen in the several large oscillations in image 650, for example.

Figure 7A:
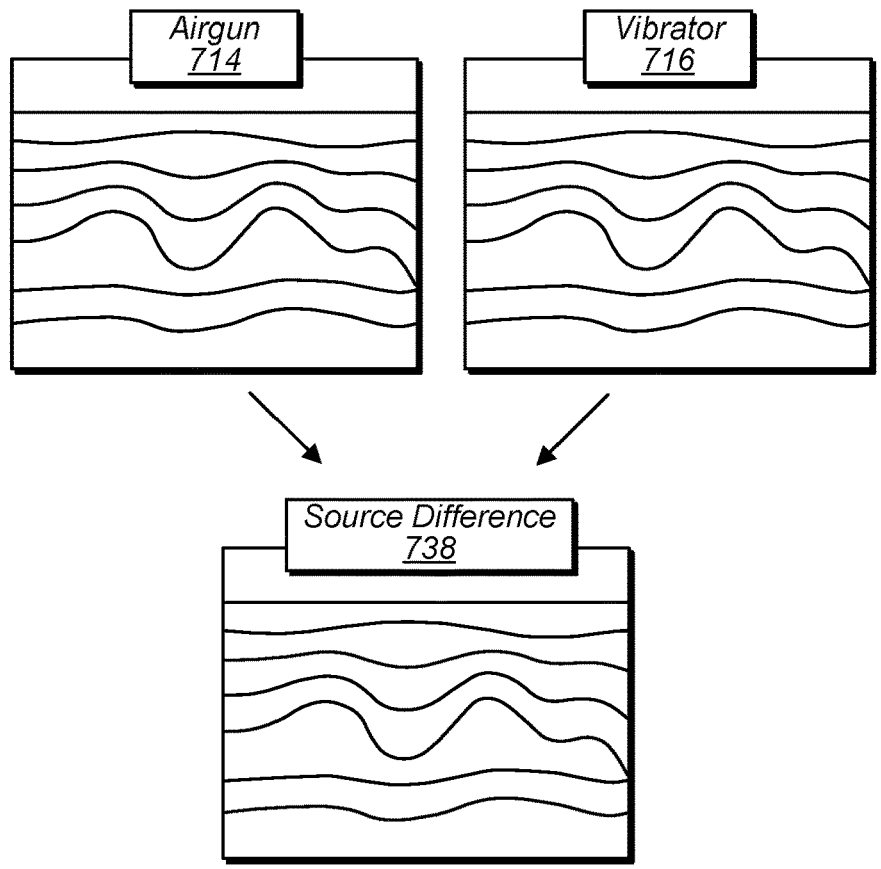
FIGS. 7A and 7B are diagrams illustrating exemplary calibration of survey passes with different types of sources using image processing, according to some embodiments.

FIG. 7A is a block diagram illustrating exemplary image processing of seismic source data to generate calibration data, according to some embodiments. In the illustrated embodiment, an airgun image 714 and a vibrator image 716, both generated from a transition survey, are processed to generate source difference image 738. The difference between the two images may be used to calibrate other airgun and/or vibrator data sets. For example, if a geological formation is shown at a particular difference in depth in one image than in another, that region of images from other data sets may be adjusted accordingly. In this example, calibration data is determined post-imaging.

Figure 7B:
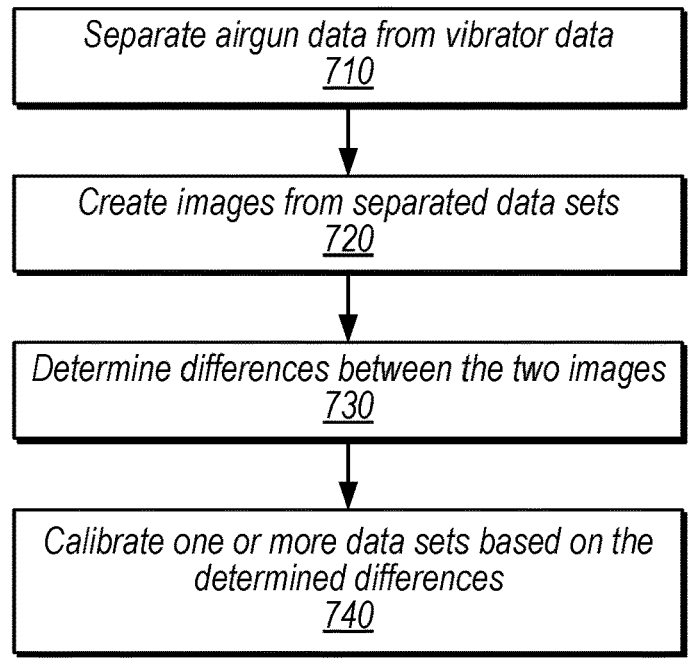

FIG. 7B is a flow diagram illustrating an exemplary method for post-image generation of calibration data, according to some embodiments. The method shown in FIG. 7B may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 710, in the illustrated embodiment, the airgun data and vibrator data are separated. This may be performed using deconvolution or other techniques, as discussed above.

At 720, in the illustrated embodiment, images are created from the separated airgun and vibrator data sets. Note that the images may be identical if no calibration is necessary. In real-world situations, the images will typically vary.

At 730, in the illustrated embodiment, differences between the two images are determined.

At 740, in the illustrated embodiment, one or more data sets are calibrated based on the determined differences.

In some embodiments, the airgun 714 and vibrator 716 images are obtained after pre-processing (e.g., applying designature techniques) of the signal data. In some embodiments, vibrator image 716 is backward compatible (e.g., with previous airgun surveys) when calibrated based on the source difference image 738 or when data from the previous survey data is calibrated based on source difference image 738. In addition, in some embodiments, vibrator image 716 is forward compatible (e.g., compatible with future vibrator surveys). In some embodiments, a calibrated vibrator image is also forward compatible with similarly-calibrated vibrator surveys.

Exemplary Methods

Figure 8:
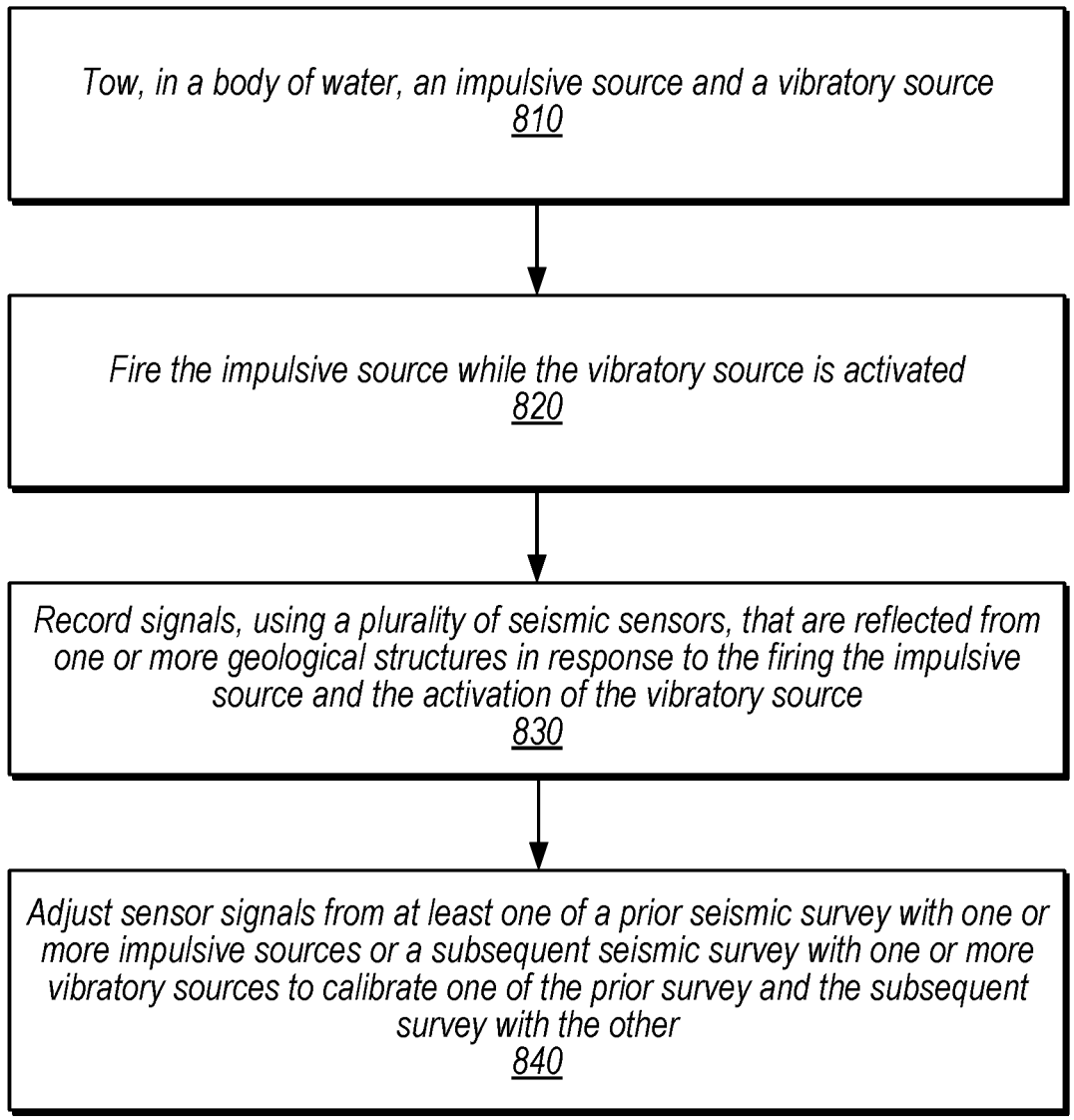
FIG. 8 is a flow diagram illustrating an exemplary method for a transitional marine geophysical survey, according to some embodiments.

FIG. 8 is a flow diagram illustrating an exemplary method for a marine geophysical survey, according to some embodiments. The method shown in FIG. 8 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 810, in the illustrated embodiment, a survey system tows an impulsive source and a vibratory source in a body of water.

At 820, in the illustrated embodiment, the survey system fires the impulsive source while the vibratory source is activated. In such embodiments, signals from both sources may propagate through the water at the same time. In some embodiments, the firing the impulsive source while the vibratory source is activated is performed during a transition survey with both vibratory and impulsive sources. In these embodiments, the recorded signals may be usable to calibrate one or more prior surveys that use impulsive sources with one or more subsequent surveys that use vibratory sources. In some embodiments, the operated vibratory source is driven using one or more gold codes during a transition survey.

At 830, in the illustrated embodiment, a plurality of seismic sensors record signals that are reflected from one or more geological structures in response to the firing of the impulsive source and the activation of the vibratory source.

At 840, in the illustrated embodiment, the system adjusts sensor signals from at least one of a prior seismic survey with one or more impulsive sources or a subsequent seismic survey with one or more vibratory sources to calibrate one of the prior survey and the subsequent survey with the other. This calibration may include adjusting sensor data from the prior survey only, the subsequent survey only, or both. In other embodiments, a survey method may include method elements 810-830 and may not include element 840, which may be performed separately.

In some embodiments, the impulsive source and the vibratory source are towed in approximately the same location. In various embodiments, a plurality of impulsive and vibratory sources are towed and simultaneously operated. One or more of the impulsive and vibratory sources may be towed using the same cable(s).

In some embodiments, a plurality of impulsive sources fire while a plurality of vibratory sources is activated. In some embodiments, signals are recorded at one seismic sensor from an impulsive source and a vibratory source that are fired and activated respectively at the same location.

FIG. 9 is a flow diagram illustrating an exemplary method for processing seismic source data, according to some embodiments. The method shown in FIG. 9 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 910, in the illustrated embodiment, a computing system accesses seismic data recorded using a plurality of seismic sensors. In the illustrated embodiment, the seismic data was recorded during a transition survey based on signals reflected from one or more geological structures in response to generating seismic signals using a first type of seismic source while also generating seismic signals using a second, different type of seismic source. Accessing the data may include receiving the first data via a network, reading the data from a storage device, or reading data in real-time as it is generated, for example. In some embodiments, the first type of seismic source may be an impulsive source such as an airgun and the second type of seismic source may be a vibratory source. In other embodiments, the first type of source may be vibratory and the second type of source may be impulsive. In some embodiments, the first and second types of sources are different types of impulsive sources (e.g., different airgun models or different types of airgun arrays). In other embodiments, the first and second types of sources may be different types of vibratory sources (e.g., different vibrator models or different types of vibrator arrays).

At 920, in the illustrated embodiment, the system adjusts, based on the accessed seismic data, sensor signals from at least one of a prior seismic survey with the first type of seismic source or a subsequent seismic survey with the second type of seismic source, wherein the adjustment calibrates one of the prior and the subsequent surveys with the other. In some embodiments, the computing system separates signals generated by the first type of source from signals generated by the second type of source. In some embodiments, the separation includes deconvolution based on a known modulation of the second type of source. In various embodiments, an example of means for separating the signals from a first type of source from the combined data includes such deconvolution. In some embodiments, the system generates difference information, indicating differences between signals from the first and second types of sources. One example of means for generating difference information involves comparing a signal measured from a first type of source (e.g., a vibratory source) and a signal measured from a second type of source (e.g., an impulsive source) and determining a difference between the obtained relationship and an expected relationship. Another specific example of such means involves comparing signal spikes from airgun and autocorrelated vibratory signals, as described above with reference to FIG. 7. Another example of such means involves generating images based on signals from the respective different types of sources (after separation) and determining differences between the images.

In some embodiments, the system uses the difference information to adjust sensor measurements of signals reflected from the geophysical formation during a prior or subsequent survey (or, in some embodiments, during the transition survey). The adjustment may calibrate sensor measurements from vibratory signals with sensor measurements from impulsive signals for the geophysical formation. Note that the various survey passes discussed herein may be performed as part of the same overall survey or as part of different surveys. In various embodiments, the techniques discussed above correspond to various means for calibrating survey data using difference information. In various embodiments, examples of such means include scaling, altering time of flight-values, adjustment of survey data in the time domain, etc.

In some embodiments, a survey using one or more vibratory sources is calibrated with a previous survey using one or more airgun sources. In some embodiments, a survey using one or more vibratory sources is calibrated with a previous survey using one or more vibratory sources and one or more airgun sources. In some embodiments, a survey using one or more vibratory sources and one or more airgun sources is calibrated with a previous survey using one or more airgun sources.

In some embodiments, the disclosed techniques may be used to calibrate data from survey passes that use different specific types of the same general type of source. For example, a first model of vibratory source may be used in a first survey and a second model of vibratory source in a second survey, and the disclosed techniques may be used to calibrate the two surveys. Although vibratory and impulsive sources are discussed herein for purposes of illustration, transition surveys with one or more of any of various types of sources are contemplated.

Example Computing System

Various operations described herein may be implemented by a computing device configured to execute program instructions that specify the operations. Similarly, various operations may be performed by circuitry designed or configured to perform the operations. In some embodiments, a non-transitory computer-readable medium has program instructions stored thereon that are capable of causing various operations described herein. As used herein, the term "processor," "processing unit," or "processing element" refers to various elements or combinations of elements configured to execute program instructions. Processing elements include, for example, circuits such as an ASIC (Application Specific Integrated Circuit), custom processing circuits or gate arrays, portions or circuits of individual processor cores, entire processor cores, individual processors, programmable hardware devices such as a field programmable gate array (FPGA) or the like, and/or larger portions of systems that include multiple processors, as well as any combinations thereof.

Figure 10:
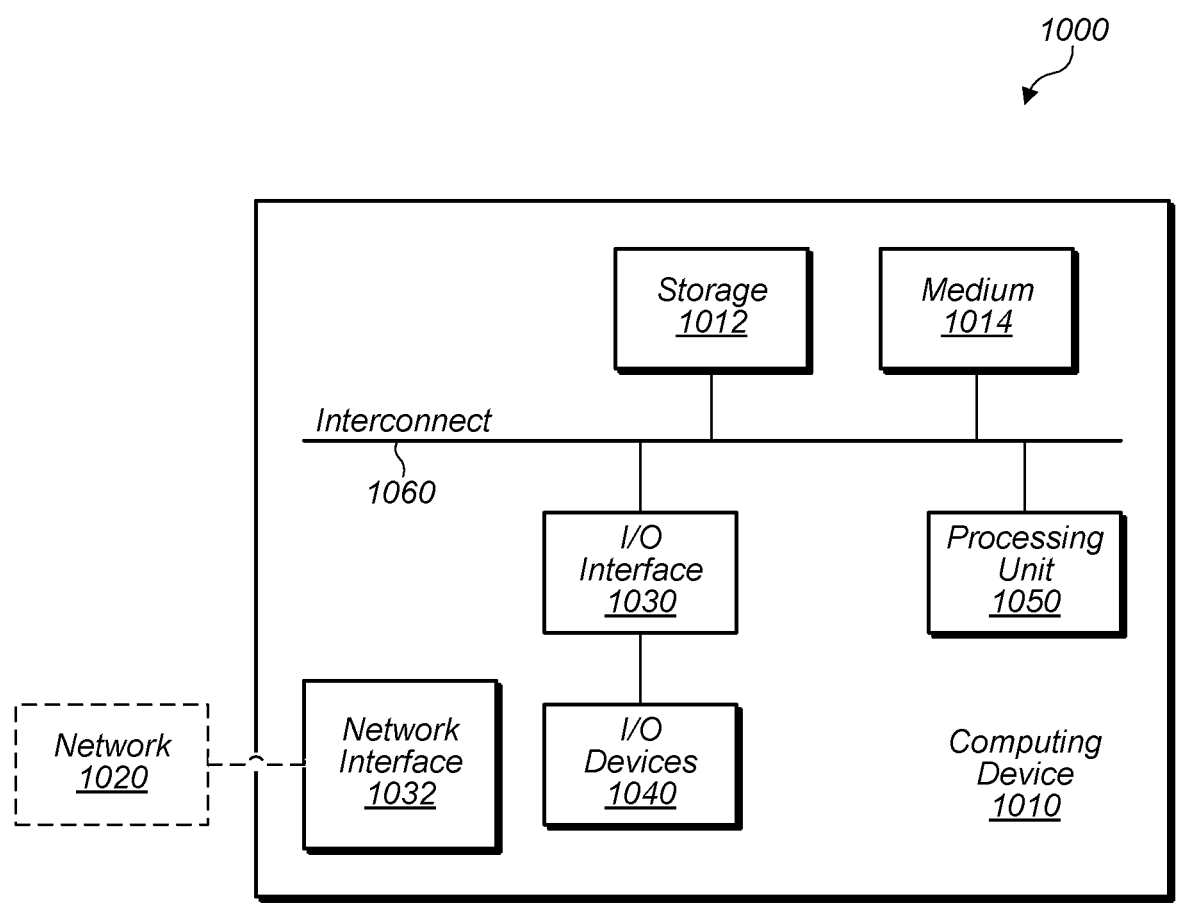
FIG. 10 is a block diagram illustrating an exemplary computing device, according to some embodiments.

Turning now to FIG. 10, a block diagram of a computing device (which may also be referred to as a computing system) 1010 is depicted, according to some embodiments. Computing device 1010 may be used to implement various portions of this disclosure. Computing device 1010 is one example of a device that may be used as a mobile device, a server computing system, a client computing system, or any other computing system implementing portions of this disclosure.

Computing device 1010 may be any suitable type of device, including, but not limited to, a personal computer system, desktop computer, laptop or notebook computer, mobile phone, mainframe computer system, web server, workstation, or network computer. As shown, computing device 1010 includes processing unit 1050, storage subsystem 1012, and input/output (I/O) interface 1030 coupled via interconnect 1060 (e.g., a system bus). I/O interface 1030 may be coupled to one or more I/O devices 1040. Computing device 1010 further includes network interface 1032, which may be coupled to network 1020 for communications with, for example, other computing devices.

As described above, processing unit 1050 includes one or more processors. In some embodiments, processing unit 1050 includes one or more coprocessor units. In some embodiments, multiple instances of processing unit 1050 may be coupled to interconnect 1060. Processing unit 1050 (or each processor within processing unit 1050) may contain a cache or other form of on-board memory. In some embodiments, processing unit 1050 may be implemented as a general-purpose processing unit, and in other embodiments it may be implemented as a special purpose processing unit (e.g., an ASIC). In general, computing device 1010 is not limited to any particular type of processing unit or processor subsystem.

Storage subsystem 1012 is usable by processing unit 1050 (e.g., to store instructions executable by and data used by processing unit 1050). Storage subsystem 1012 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1012 may consist solely of volatile memory in some embodiments. Storage subsystem 1012 may store program instructions executable by computing device 1010 using processing unit 1050, including program instructions executable to cause computing device 1010 to implement the various techniques disclosed herein. In at least some embodiments, storage subsystem 1012 may represent an example of a non-transitory computer-readable medium that may store executable instructions.

In the illustrated embodiment, computing device 1010 further includes non-transitory medium 1014 as a possibly distinct element from storage subsystem 1012. For example, non-transitory medium 1014 may include persistent, tangible storage such as disk, nonvolatile memory, tape, optical media, holographic media, or other suitable types of storage. In some embodiments, non-transitory medium 1014 may be employed to store and transfer geophysical data, and may be physically separable from computing device 1010 to facilitate transport. Accordingly, in some embodiments, the non-transitory medium 1014 may constitute the geophysical data product discussed above. Although shown to be distinct from storage subsystem 1012, in some embodiments, non-transitory medium 1014 may be integrated within storage subsystem 1012.

I/O interface 1030 may represent one or more interfaces and may be any of various types of interfaces configured to couple to and communicate with other devices, according to various embodiments. In some embodiments, I/O interface 1030 is a bridge chip from a front-side to one or more back-side buses. I/O interface 1030 may be coupled to one or more I/O devices 1040 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.). In some embodiments, the geophysical data product discussed above may be embodied within one or more of I/O devices 1040.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "apparatus configured to steer a vibratory source" is intended to cover, for example, an apparatus that performs this function during operation, even if the corresponding device is not currently being used (e.g., when power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Should Applicant wish to invoke Section 112(f), it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents (such as "one or more" or "at least one") unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Moreover, where flow charts or flow diagrams are used to illustrate methods of operation, it is specifically contemplated that the illustrated operations and their ordering demonstrate only possible implementations and are not intended to limit the scope of the claims. It is noted that alternative implementations that include more or fewer operations, or operations performed in a different order than shown, are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although various advantages of this disclosure have been described, any particular embodiment may incorporate some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims, and features from respective independent claims may be combined in any appropriate manner and not merely in the specific combinations enumerated in the appended claims.

What is claimed is:

1. A method, comprising:
    accessing, by a computing system, seismic data recorded using a plurality of seismic sensors during a transition survey, wherein the seismic data was recorded based on signals reflected from one or more geological structures in response to generating seismic signals using a first type of seismic source while also generating seismic signals using a second, different type of seismic source; and
    adjusting, by the computing system based on the accessed seismic data from the transition survey, sensor signals from at least one of a prior seismic survey that used the first type of seismic source or a subsequent seismic survey that used the second type of seismic source, wherein the adjusting calibrates one of the prior and the subsequent surveys with the other;
    wherein the transition survey comprised a 4D seismic survey relative to at least one of the prior seismic survey and the subsequent seismic survey, such that both the transition survey and the at least one survey employed seismic sensors spaced apart in an inline direction and in a crossline direction, and such that an elapsed time between the transition survey and the at least one survey was sufficiently long to allow detectable changes to occur in the geological structures between a time of the transition survey and a time of the at least one survey.

2. The method of claim 1, wherein the first type of seismic source is an impulsive source and the second type of seismic source is a vibratory source.

3. The method of claim 1, wherein the first type of seismic source is a vibratory source and the second type of seismic source is an impulsive source.

4. The method of claim 1, wherein the first type of seismic source is a first type of impulsive source and the second type of seismic source is a second, different type of impulsive source.

5. The method of claim 1, wherein the first type of seismic source is a first type of vibratory source and the second type of source is a second, different type of vibratory source.

6. The method of claim 1, further comprising:
    separating signals generated by the first type of seismic source from signals generated by the second type of seismic source;
    generating difference information indicating differences between signals from the first type of seismic source and signals from the second type of seismic source; and
    using the difference information to perform the adjusting.

7. The method of claim 6, wherein the separating is based on a known modulation of the second type of seismic source.

8. The method of claim 7, wherein the separating is performed by deconvolving the recorded signals with a signal used to modulate the second type of seismic source.

9. The method of claim 6, wherein the generating the difference information includes autocorrelating the reflected signal generated by the second type of seismic source with a signal used to modulate the second type of seismic source and comparing a result of the autocorrelation with the reflected signal generated by the first type of seismic source.

10. The method of claim 6, further comprising:
    generating a first image of the one or more geological structures based on signals generated by the second type of seismic source; and
    generating a second image of the one or more geological structures based on signals generated by the first type of seismic source;
    wherein the generating the difference information is based on differences between the first image and the second image.

11. The method of claim 1, wherein the generating seismic signals using the first type of seismic source and the generating seismic signals using the second type of seismic source were performed at a location of generating seismic signals using the first type of seismic source in the prior survey, wherein the prior survey did not use any seismic sources of the second type.

12. The method of claim 1, further comprising performing the transition survey, including:
    towing, in a body of water, the first type of seismic source and the second type of seismic source;
    generating the seismic signals using the first type of seismic source while also generating the seismic signals using the second type of seismic source; and
    recording the seismic data using the plurality of seismic sensors.

13. The method of claim 1, wherein:
    the elapsed time between the transition survey and the at least one survey was at least one month.

14. The method of claim 1, wherein:
    the elapsed time between the transition survey and the at least one survey was at least one year.

15. A system, comprising:
one or more processors; and
one or more memories having instructions stored thereon that are executable by the one or more processors to:
access seismic data recorded using a plurality of seismic sensors during a transition survey, wherein the seismic data was recorded based on signals reflected from one or more geological structures in response to generating seismic signals using a first type of seismic source while also generating seismic signals using a second, different type of seismic source; and
adjust, based on the accessed seismic data from the transition survey, sensor signals from at least one of a prior seismic survey that used the first type of seismic source or a subsequent seismic survey that used the second type of seismic source, wherein the adjustment calibrates one of the prior and the subsequent surveys with the other;
wherein the transition survey comprised a 4D seismic survey relative to at least one of the prior seismic survey and the subsequent seismic survey, such that both the transition survey and the at least one survey employed seismic sensors spaced apart in an inline direction and in a crossline direction, and such that an elapsed time between the transition survey and the at least one survey was sufficiently long to allow detectable changes to occur in the geological structures between a time of the transition survey and a time of the at least one survey.

16. The system of claim 15, wherein the first type of seismic source is an impulsive source and the second type of seismic source is a vibratory source.

17. The system of claim 15, wherein the first type of seismic source is a first type of impulsive source and the second type of seismic source is a second, different type of impulsive source.

18. The system of claim 15, wherein the system is further configured to:
separate signals generated by the first type of seismic source from signals generated by the second type of seismic source;
generate difference information indicating differences between signals from the first type of seismic source and signals from the second type of seismic source; and
use the difference information to perform the adjustment.

19. The system of claim 18, wherein the separation is performed based on a known modulation of the second type of seismic source.

20. The system of claim 18, wherein, to generate the difference information, the system is configured to autocorrelate the reflected signal generated by the second type of seismic source with a signal used to modulate the second type of seismic source and compare a result of the autocorrelation with the reflected signal generated by the first type of seismic source.

21. The system of claim 15, further comprising:
the first type of seismic source;
the second type of seismic source;
the plurality of seismic sensors; and
control equipment configured to performing the transition survey, including to:
tow, in a body of water, the first type of seismic source and the second type of seismic source;
generate the seismic signals using the first type of seismic source while also generating the seismic signals using the second type of seismic source; and
record the seismic data using the plurality of seismic sensors.

22. The method of claim 15, wherein:
the elapsed time between the transition survey and the at least one survey was at least one month.

23. The method of claim 15, wherein:
the elapsed time between the transition survey and the at least one survey was at least one year.

24. A non-transitory computer-readable medium having instructions stored thereon that are executable by a computing device to perform operations comprising:
accessing seismic data recorded using a plurality of seismic sensors during a transition survey, wherein the seismic data was recorded based on signals reflected from one or more geological structures in response to generating seismic signals using a first type of seismic source while also generating seismic signals using a second, different type of seismic source; and
adjusting, based on the accessed seismic data from the transition survey, sensor signals from at least one of a prior seismic survey that used the first type of seismic source or a subsequent seismic survey that used the second type of seismic source, wherein the adjusting calibrates one of the prior and the subsequent surveys with the other;
wherein the transition survey comprised a 4D seismic survey relative to at least one of the prior seismic survey and the subsequent seismic survey, such that both the transition survey and the at least one survey employed seismic sensors spaced apart in an inline direction and in a crossline direction, and such that an elapsed time between the transition survey and the at least one survey was sufficiently long to allow detectable changes to occur in the geological structures between a time of the transition survey and a time of the at least one survey.

25. The non-transitory computer-readable medium of claim 24, wherein the first type of seismic source is an impulsive source and the second type of seismic source is a vibratory source.

26. The non-transitory computer-readable medium of claim 24, wherein the operations further comprise:
separating signals generated by the first type of seismic source from signals generated by the second type of seismic source;
generating difference information indicating differences between signals from the first type of seismic source and signals from the second type of seismic source; and
using the difference information to perform the adjusting.

27. The non-transitory computer-readable medium of claim 26, wherein the separating is based on a known modulation of the second type of seismic source.

28. The non-transitory computer-readable medium of claim 26, wherein the generating the difference information includes autocorrelating the reflected signal generated by the second type of seismic source with a signal used to modulate the second type of seismic source and comparing a result of the autocorrelation with the reflected signal generated by the first type of seismic source.

29. The non-transitory computer-readable medium of claim 26, wherein the operations further comprise:
generating a first image of the one or more geological structures based on signals generated by the second type of seismic source; and
generating a second image of the one or more geological structures based on signals generated by the first type of seismic source;

wherein the generating the difference information is based on differences between the first image and the second image.

30. The method of claim 24, wherein:
the elapsed time between the transition survey and the at least one survey was at least one month.

31. The method of claim 24, wherein:
the elapsed time between the transition survey and the at least one survey was at least one year.

32. In a technological process in which images from a monitor seismic survey are generated for comparison with images from a baseline seismic survey to detect changes in subsurface characteristics, wherein the monitor survey occurs after the baseline survey, the specific improvement comprising:
performing a transition survey using first and second different source types, the first type corresponding to a type used in the baseline seismic survey, and the second type corresponding to a type used or to be used in the monitor survey;
determining differences between signals recorded from the first and second source types during the transition survey; and
using the differences to adjust sensor signals from at least one of the baseline survey and the monitor survey, thereby enabling the generation of a monitor survey image and a baseline survey image such that differences between the images indicate changes in geological structures and not changes in seismic source types;
wherein the transition survey comprises a 4D seismic survey relative to at least one of the baseline survey and the monitor survey, such that both the transition survey and the at least one survey employ seismic sensors spaced apart in an inline direction and in a crossline direction, and such that an elapsed time between the transition survey and the at least one survey is sufficiently long to allow detectable changes in the subsurface characteristics to occur between a time of the transition survey and a time of the at least one survey.

33. The method of claim 32, wherein:
the elapsed time between the transition survey and the at least one survey is at least one month.

34. The method of claim 32, wherein:
the elapsed time between the transition survey and the at least one survey is at least one year.

35. A method of performing 4D seismic surveying, comprising:
accessing first seismic data corresponding to a first seismic survey over a location, wherein the first seismic survey was performed using a first seismic source type and not a second seismic source type;
subsequent to the first seismic survey, performing a second seismic survey over the location to produce second seismic data, wherein the second seismic survey is performed using both the first seismic source type and the second seismic source type;
subsequent to the second seismic survey, performing a third seismic survey over the location to produce third seismic data, wherein the third seismic survey is performed using the second seismic source type and not the first seismic source type;
determining, based on the second seismic data, source difference data indicating differences attributable to source types and not to changes in geological structures associated with the location; and
isolating changes in the geological structures that occurred between a time of the first seismic survey and a time of the third seismic survey, wherein the isolating comprises modifying, based on the source difference data, one of the first seismic data or the third seismic data;
wherein the second seismic survey comprises a 4D seismic survey relative to at least one of the first seismic survey and the third seismic survey, such that both the second survey and the at least one survey employ seismic sensors spaced apart in an inline direction and in a crossline direction, and such that an elapsed time between the second survey and the at least one survey is sufficiently long to allow detectable changes to occur in the geological structures between a time of the second survey and a time of the at least one survey.

36. The method of claim 35, further comprising:
performing the first seismic survey.

37. The method of claim 35, wherein:
the source difference data comprise pre-imaging differences.

38. The method of claim 37, wherein one of the first and the second seismic source types is an impulsive source type and the other is a non-impulsive source type, and wherein the method further comprises:
generating a non-impulsive source autocorrelation spike from the second seismic data;
determining an impulsive source spike from the second seismic data; and
wherein determining the source difference data comprises comparing the non-impulsive source autocorrelation spike with the impulsive source spike.

39. The method of claim 35, wherein:
the source difference data comprise post-imaging differences.

40. The method of claim 39, further comprising:
separating, from the second seismic data, first separated signals attributable to the first source type but not the second source type, and second separated signals attributable to the second source type but not the first source type;
generating a first image based on the first separated signals;
generating a second image based on the second separated signals; and
wherein determining the source difference data comprises comparing the first image and the second image.

41. The method of claim 40, wherein:
one of the first source type and the second source type is an impulsive source type and the other is a non-impulsive source type.

42. The method of claim 35, wherein:
one of the first source type and the second source type is an impulsive source type and the other is a non-impulsive source type.

43. The method of claim 42, wherein:
the impulsive source type comprises an air gun.

44. The method of claim 42, wherein:
the non-impulsive source type comprises a marine vibrator.

45. The method of claim 42, wherein:
the impulsive source type comprises an air gun; and
the non-impulsive source type comprises a marine vibrator.

46. The method of claim 35, further comprising:
recording the changes, or data indicative thereof, in a non-transitory computer-readable medium, thereby completing the manufacture of a geophysical data product.

47. The method of claim 35, wherein:
the elapsed time between the second survey and the at least one survey is at least one month.

48. The method of claim 35, wherein:
the elapsed time between the second survey and the at least one survey is at least one year.

* * * * *

UNITED STATES PATENT AND TRADEMARK OFFICE
CERTIFICATE OF CORRECTION

| | |
|---|---|
| PATENT NO. | : 11,899,151 B2 |
| APPLICATION NO. | : 16/213214 |
| DATED | : February 13, 2024 |
| INVENTOR(S) | : Edwin Hodges and Manuel Beitz |

It is certified that error appears in the above-identified patent and that said Letters Patent is hereby corrected as shown below:

In the Claims

In Claim 5 at Line 3, insert --seismic-- between "of" and "source".

In Claim 9 at Line 2, replace "the" with --a--.

In Claim 9 at Line 5, replace the last occurrence of "the" with --a--.

In Claim 20 at Line 3, replace the first occurrence of "the" with --a--.

In Claim 20 at Line 6, replace the first occurrence of "the" with --a--.

In Claim 22 at Line 1, replace "method" with --system--.

In Claim 23 at Line 1, replace "method" with --system--.

In Claim 28 at Line 3, replace the first occurrence of "the" with --a--.

In Claim 28 at Line 6, replace the second occurrence of "the" with --a--.

In Claim 30 at Line 1, replace "method" with --non-transitory computer-readable medium--.

In Claim 31 at Line 1, replace "method" with --non-transitory computer-readable medium--.

Signed and Sealed this
Twenty-second Day of October, 2024

Katherine Kelly Vidal
*Director of the United States Patent and Trademark Office*